United States Patent
Joshi et al.

(10) Patent No.: US 10,503,693 B1
(45) Date of Patent: Dec. 10, 2019

(54) METHOD AND SYSTEM FOR PARALLEL FILE OPERATION IN DISTRIBUTED DATA STORAGE SYSTEM WITH MIXED TYPES OF STORAGE MEDIA

(71) Applicant: DATADIRECT NETWORKS, INC., Chatsworth, CA (US)

(72) Inventors: Rajkumar Joshi, Simi Valley, CA (US); Michael Piszczek, Laurel, MD (US); David F. Fellinger, Westlake Village, CA (US)

(73) Assignee: DataDirect Networks, Inc., Chatsworth, CA (US)

(*) Notice: Subject to any disclaimer, the term of this patent is extended or adjusted under 35 U.S.C. 154(b) by 340 days.

(21) Appl. No.: 15/217,292

(22) Filed: Jul. 22, 2016

(51) Int. Cl.
| | |
|---|---|
| G06F 7/00 | (2006.01) |
| G06F 17/30 | (2006.01) |
| G06F 16/13 | (2019.01) |
| H04L 29/08 | (2006.01) |
| G06F 16/188 | (2019.01) |
| G06F 16/18 | (2019.01) |

(52) U.S. Cl.
CPC .......... *G06F 16/134* (2019.01); *G06F 16/137* (2019.01); *G06F 16/188* (2019.01); *G06F 16/1858* (2019.01); *H04L 67/1097* (2013.01)

(58) Field of Classification Search
CPC ............. G06F 12/0246; G06F 12/0871; G06F 17/30194; G06F 16/134; G06F 16/1858; G06F 16/188
USPC .................................. 707/792, 823, 826, 736
See application file for complete search history.

(56) References Cited

U.S. PATENT DOCUMENTS

| | | | |
|---|---|---|---|
| 9,116,819 B2 | 8/2015 | Cope et al. | |
| 9,152,649 B2 | 10/2015 | Nowoczynski et al. | |
| 9,213,489 B1 | 12/2015 | Nowoczynski et al. | |
| 2013/0167028 A1* | 6/2013 | Goldman | H04N 21/4425 715/716 |
| 2014/0130119 A1* | 5/2014 | Goldschlag | H04L 63/101 726/1 |

OTHER PUBLICATIONS

Author: Beth Pariseau, Title: DataDirect Networks Web Object Scaler (WOS) challenges EMC's Atmos in the cloud, date: Jun. 22, 2009, pp. 1-2.*

* cited by examiner

*Primary Examiner* — Md I Uddin
(74) *Attorney, Agent, or Firm* — Rosenberg, Klein & Lee

(57) ABSTRACT

The present invention is directed to a distributed data migration and storage system and method configured for fully parallel writing and retrieval of data objects to (and from) the Web Object Scaler (WOS) object storage system with highly efficient accessibility and using a simplified set of filing commands. The data objects migrate between data generating entities and the WOS object storage through an intermediate Burst Buffer tier (supported by the Infinite Memory Engine) without the utilization of a serial process substantially simultaneously through parallel channels. The metadata for each object is captured with appropriate pointers for efficient finding of the object in the WOS storage system. The WOS nodes return the stored objects' ID (OIDs) corresponding to the objects storage address which are used for the object access.

23 Claims, 6 Drawing Sheets

METHOD AND SYSTEM FOR PARALLEL FILE OPERATION IN DISTRIBUTED DATA STORAGE SYSTEM WITH MIXED TYPES OF STORAGE MEDIA

FIELD OF THE INVENTION

The present invention is directed to an object storage system and method for storing and accessing immutable objects in a Web Object Scaler (WOS) objects management and placement system.

In addition, the present invention is directed to a distributed data storage system configured for fully parallel storage and retrieval of data objects in (and from) an object storage system with highly efficient accessibility with the use of a simplified set of filing commands.

The present invention is also directed to a system and method for complete parallel file operation in distributed data storage system where objects migrate between data generating entities and the WOS object storage through intermediate I/O nodes (supported by the Infinite Memory Engine) without the utilization of a serial process, where objects are transferred in the form of requested file segments, substantially simultaneously through parallel busses to (and from) the WOS object storage. The metadata for each object is captured with appropriate pointers for efficient accessing of the object in the WOS storage system.

Furthermore, the present invention is directed to a system and method for data migration between high performance computing architectures (also referred to herein as data generating entities, or clients, as well as compute nodes) and long-term (or persistent) object storage system through an intermediate Burst Buffer (BB) tier. The BB tier is coupled between the data generating entities and the object storage system to store data "write" requests in the Burst Buffer tier in an expedited manner prior to writing (in a parallel fashion) the data "write" requests in the object storage system which returns the stored objects' ID (OIDs) corresponding to the objects storage address used when an object is to be "read" or deleted from the object storage system.

Additionally, the present invention is directed to a data migration system and a method for substantially parallel writing of data segments in the form of objects to a number of object storage devices and providing pointers to the objects through the use of a persistent index in order to correlate the Distributed Hash Table (DHT) residing in the intermediate Burst Buffer tier and the object storage. In this manner, the data can be migrated with a practically unlimited I/O bandwidth that is constrained only by the number of the I/O nodes in the intermediate BB tier and the available object storage nodes (WOS nodes).

In addition, the present system is directed to a data storage system using an Infinite Memory Engine (IME) which is supported by the concept of a Burst Buffer tier, serving as a mediator between high performance computing clients and an object storage (WOS) system for long term data storage. This exploits a distributed array of Non-Volatile Memory (NVM) and Distributed Hash Table (DHT) devices interconnected via a low-latency infrastructure to enable a fast ingest of data "write" requests from high performance computers to the NVM devices by storing the data "write" requests in an unstructured manner, and supporting a fully parallel egress of objects corresponding to the data "write" requests, or their portions, from the distributed NVM array in the BB tier to a long-term (or permanent) objects storage where the objects are easily found (when needed for reading or deletion) via their OIDs (stored in the DHT) which are furnished by the object storage nodes upon completion of the object(s) writing.

The present invention is also directed to the system and method where the data storage process is divided among a plurality of distributed nodes for both the temporary (I/O nodes) and permanent storage (WOS nodes) to greatly decrease the latency of the entire data storage process.

BACKGROUND OF THE INVENTION

File systems in data migration systems are used to store and organize computer data as electronic files. File systems store ("write") files on storage media, and are configured to provide the function of accessing data files, i.e., finding, reading, and deleting, of the stored files, as needed.

The process of file creation in data storage systems has essentially remained unchanged since the beginning of the computer file system technology. In the conventional file system, each file has an internal address held in a File Allocation Table (FAT). The internal address of a file is referenced to an external address structure consisting of readable file names called a Vnode table.

File creation in the typical file systems usually starts with an assignment of a file name (or "handle") that is locked when it is created, so that another user cannot access that name at the same time. The "handle" (which is also called a Vnode) is assigned a structure (which is called an Inode), and the Inode is placed in the FAT while block addresses are gathered to place the data on the storage medium.

The filing process usually assumes grouping of unused storage blocks, i.e., the unused storage blocks are assembled into extent lists indicating where the data starts and how many blocks it occupies. Multiple extent lists are gathered behind an Inode until an "end of file" designator is reached which is indicative of the file completion resulting in the termination of the transaction.

The conclusion of the filing process usually requires acknowledgement of the operation to the host computer and release of "locks" on both the Vnode and Inode. The entire filing process is largely serial with each step sequentially following the preceding step until the file is written and the filing process is completed.

A technique for a parallel file creation has been developed, which, for example, is described in U.S. Pat. No. 9,116,819 teaching a method of writing data from a compute cluster client in a "write anywhere" technique, where the "WRITE" operation—goes to any available storage node or a multiple of storage nodes based upon nodes availability. Other parallel file systems are described in U.S. Pat. No. 9,152,649 (which teaches a method of ordering the data for easy reading), and in U.S. Pat. No. 9,213,489 (which teaches a method of finding storage locations through a metadata hash process).

U.S. Pat. Nos. 9,116,819, 9,152,649, and 9,213,489 generally teach that a file creation does not have to be a fully serial process which is prevalent in existing file systems, but rather a parallel process since the data can be written to multiple nodes effectively at the same time.

A "Distributed Hash Table" (DHT) is used in these parallel filing systems for data retention. The DHT constitutes a temporary storage mechanism to greatly decrease the latency required to migrate data from a compute cluster to a storage device. However, persistent storage of the DHT data is generally enabled by a mechanism which migrates data to a traditional file system through a gateway node by using a serial process of Inode creation as described supra.

Traditional file systems require at least three layers of software constructs to execute any file operation, and data is stored in available blocks which are gathered and apportioned based on availability at the time the data is written. Since traditional file systems allow file amendment by multiple users, they must maintain complex lock structures with open and close semantics. These lock structures must be distributed coherently to all of the servers used for data access. Since data is placed based on random block availability, the traditional file systems are fragmented. This is especially true in environments where the data is unstructured, and it is not uncommon to write widely varied file sizes. Using a traditional file system designed for amendable data to store immutable data constitutes an inappropriate and wasteful use of bandwidth and computer sources. This wasteful practice results in the requirement for a great deal of additional hardware and network resources to achieve data distribution goals.

It would be highly desirable to provide a data storage system and method utilizing a fully parallel data migration process including parallel migration between the DHT and a persistent storage.

SUMMARY OF THE INVENTION

It is therefore an object of the subject invention to provide a system and a method utilizing a fully parallel aspect of the data migration from the DHT to a persistent storage avoiding the utilization of a serial filing approach.

It is another object of the present invention to provide a data migration system supported by an IME (Infinite Memory Engine) operatively interconnecting data generating entities and an object storage cloud, where the traditional file system gateway is replaced with an unique WOS (Web Object Scaler) system built with an object storage cluster (which is a dynamically formed portion of the WOS cloud). This can have as many (or more) nodes as the DHT portions residing in the IME nodes in an intermediate Burst Buffer tier. Objects are transferred simultaneously through parallel busses to the persistent object storage cloud while the metadata of the objects are captured with the appropriate pointers such that a client of the object storage can find the data as a coherent object in a highly efficient fashion.

It is a further object of the present invention to provide a data migration system and method utilizing an object storage system where data is efficiently written to persistent object storage devices depending on availability of those devices at any point in time. Additionally, the data segments are written in the form of objects to a number of storage devices substantially at the same time as long as pointers to the objects are provided through the use of a persistent index. This makes it possible to connect the DHT and the object storage, such that the data can migrate with a bandwidth that is practically unlimited, and is constrained only by the number of IME nodes and available object storage nodes.

It is an additional object of the subject invention to provide a data storage system and method supporting parallel writing and reading, as well as deleting, operations implemented essentially by distributing the I/O operations among a number of parallel paths, and wherein the process time of a file creation is divided by a plurality of nodes for both the temporary and permanent storage of the data, to decrease the latency of the entire file creation process.

In one aspect, the present invention is directed to a system for data migration between data generating entities and an object storage system which is built with a Burst Buffer (BB) tier operatively coupled between at least one data generating entity and the WOS (Web Object Scaler) object storage system. The system is configured with a plurality of operatively interconnected I/O nodes and a plurality of Non-Volatile Memory (NVM) units, each operatively associated with a respective I/O node. In addition, a Distributed Hash Table (DHT) server is operatively coupled to the BB tier. The DHT server includes a plurality of DHT portions. Each of the DHT portions is maintained by a respective one of the I/O nodes.

The data generating entity is configured to generate "write" requests for writing data objects to the WOS object storage system and to assign I/O nodes to handle the "write" requests. Each data object is stored in the NVM unit of a respective assigned I/O node in a files opened (or created) by the I/O nodes in parallel fashion.

The data objects are subsequently transferred from the NVM units of the I/O nodes to object storage nodes (WOS nodes) of the WOS object storage system in accordance with a preferred mode of operation available for the subject data migration system. The mode of operation may be one of a push mode of operation, a multipart mode of operation, a pull mode of operation, and a reservation mode of operation.

Each WOS node is configured to generate an object identifier (OID) for each data object written in the WOS node, and to return the OID to the BB tier to be stored in the DHT server.

Each I/O node includes an Infinite Memory Engine (IME) server and a Distributed Name Space (DNS) server operatively coupled to the IME server. The IME server in each I/O node is configured with operative connection to the DHT portion and the NVM unit of the I/O node.

The DNS server of each I/O node is configured with a respective DNS DHT portion, a respective DNS NVM unit, and a Virtual File System. The DNS server is also configured with the ability to search for the files requested by the data generating entity for temporarily storing the data objects If the requested file exists in the DHT portion of the DNS server, it creates a virtual Mode for the existing file, and passes the virtual file Mode to the respective IME server operatively coupled thereto. In this manner the IME server can respond to data generating entity with the virtual Mode for subsequent storing the data object in the WOS storage system and entering the virtual Mode into the Virtual File System.

If, however, the requested file is absent from the DNS DHT portions of the I/O nodes, the DNS server assigns a virtual Inode to the absent file, and the IME server responds to the requesting data generating entity with the assigned virtual Inode for subsequent writing of the data object to the WOS storage, depending on the policies invoked in the system.

The IME server of each I/O node is configured with a Policy Engine determining when the data generating entity is permitted to begin writing the data objects from the NVM units to the WOS nodes subsequent to the receipt of the virtual Inodes.

The Policy Engine is configured to schedule the "writes" of the data objects to the WOS nodes based on criteria corresponding either on the fullness of the NVM units of the I/O nodes, the expiration of a predetermined idle timeout, the completion of computations on the WOS system, or combinations thereof.

A Remote Procedure Call (RPC) mechanism is operatively coupled to each DNS server of the plurality of I/O nodes for communicating with the DNS servers in the BB tier to prevent multiple "file open" or "file create" requests for the same file.

For operating in the push mode of operation, each I/O node is configured with an object storage system client (WOS client), which functions to "push" data objects from the NVM units of the I/O nodes to the WOS storage via parallel routes.

For operating in the multipart mode of operation, a multipart object is formed from several data objects, and the multipart object is written to the WOS cluster substantially in parallel with the data objects.

Each WOS node is configured to generate a single OID for the multipart object written at the respective WOS node. The single OID for the multipart object is stored in the DHT server in the BB tier.

Each I/O node is configured with the ability to identify a WOS node for space reservation for writing the data object upon receipt of a reservation request from the data generating entity. The identified WOS node is configured to generate a reservation identifier, which is sent to the I/O node to be saved in the DHT server.

In the pull mode of operation, each WOS node is configured with a scheduler mechanism and an IME client. The IME client residing at (or operatively coupled to) the WOS node performs a controlled retrieval of the data objects from the NVM units where the data objects reside under control of the scheduler mechanism.

In another aspect, the present invention is directed to a method for parallel file operation supported by a distributed data storage system which is built with a Burst Buffer (BB) tier coupled between at least one data generating entity and an object storage system. The object storage system is preferably a Web Object Scaler (WOS) objects management and placement system configured with a plurality of WOS nodes dynamically arranged in WOS clusters, each of which is a portion of a WOS cloud architecture. The BB tier is configured with a plurality of operatively interconnected I/O nodes and a plurality of Non-Volatile Memory (NVM) units, where each NVM unit is operatively associated with a respective I/O node.

The subject method assumes coupling a Distributed Hash Table (DHT) server to the BB tier. The DHT server includes a plurality of DHT portions, with each of the DHT portions being maintained by a respective one of the plurality of I/O nodes.

The subject method is initiated when at least one data generating entity generates "write" requests for writing at least two data objects to the WOS storage and assigns I/O nodes to handle the "write" request.

Sequentially, the data objects are stored in the NVM units of the assigned I/O nodes with each data object in a respective file.

Subsequent to the temporal storage of the data objects in the I/O nodes, a substantially parallel writing of the data objects is performed from the NVM units of the I/O nodes to respective WOS nodes of the WOS storage system in accordance with a preferred mode of operation selected from a group including: (a) a push mode of operation, (b) a multipart mode of operation, (c) a pull mode of operation, and (d) a reservation mode of operation.

Subsequent to writing the data objects in the WOS nodes, the method performs the step of generating (by a respective storage node), an object identifier (OID) for each written data object. The OID for each written data object is returned to the I/O nodes and stored in a respective DHT portion of the DHT server in the BB tier.

Prior to servicing the data object "write" request, a routine of parallel file creation in the I/O nodes for the requested data objects is executed which is initiated upon receiving "file open" or "file create" requests from the data generating entity.

The subject method is further contemplated with the steps of:

configuring each I/O node in the BB tier with an Infinite Memory Engine (IME) server and a Distributed Name Space (DNS) server operatively coupled to IME server, configuring the IME server with operative connection to the DHT portion and the NVM unit, configuring the DNS server of each the I/O node with a respective DNS DHT portion, a respective DNS NVM unit, and a Virtual File System, subsequent to the receipt of the "file open" or "file create" request from the data generating entity, searching (by the DNS server) the file requested by the data generating entity in the respective DNS DHT portions of the I/O nodes.

If the requested file exists therein, the method continues by creating (by the DNS server), a virtual Inode for the existing file, and passing the virtual file Inode to the IME server operatively coupled to the DNS server, and responding, by the IME server, to the requesting data generating entity with the virtual Inode.

If, however, the requested file is absent from the DNS DHT portions of the I/O nodes, the method continues by assigning a virtual Inode (by the DNS server) for the absent file, and responding, by the IME server, to the requested data generating entity with the assigned virtual Inode.

The subject method further proceeds with the steps of:

configuring the IME server of each I/O nodes with a Policy Engine for determining when the requesting data generating entity is allowed to begin writing the data objects from the NVM units to the WOS storage nodes upon receipt of the virtual Inodes for the requested and created parallel files.

The method further comprises:

configuring the DNS server with a Virtual File System, entering the virtual Inodes into the Virtual File System, and saving the virtual Inodes for the requested files Inodes and corresponding entries to the Virtual File System into the NVM units of the DNS servers of the I/O nodes.

The Policy Engine is configured to schedule the writes of the data objects to the WOS nodes based on at least one criteria, such as the fullness of said NVM units of said at least two I/O nodes, expiration of a predetermined idle timeout, completion of computations on said object storage system, and combinations thereof.

The method further proceeds with creating a list of data objects in each of the requested files by the DNS server, and saving the list in the DNS NVM.

Each I/O node is configured with an object storage system client (WOS client), which operates, in the push mode of operation, to push the data objects from the NVM units of the I/O nodes to the WOS storage via parallel routes under control of the WOS client.

In the multipart mode of operation, a multipart object is formed from data objects, and the multipart object is written substantially in parallel with the data objects into the WOS object storage Subsequent thereto, each WOS object storage node generates a single OID for the multipart object written at the WOS node, and the single OID is stored in the DHT server in the BB tier.

In the reservation mode of operation, the subject method is initiated when a reservation request is received (from the IME client at the data generating entity or from an external application) for a data object to at least one I/O node. The reservation routine continues by:

identifying at least one WOS object storage node (by the I/O node) for servicing the reservation request, sending the reservation request to the identified WOS node, generating (by the WOS node) a reservation identifier, sending the reservation identifier to the I/O node, and saving the reservation identifier in the DHT server.

In the reservation mode of operation, the method continues via the steps of:

generating the "write" request by at least one data generating entity specifying the data object for the reservation request, verifying presence of the reservation for the data object, and writing the data object to a storage media of the WOS storage node.

In the present method, at least two data objects may constitute cumulatively fragments (or portions) of a "write" request generated by the data generating entity.

In the pull mode of operation, the method is implemented through the steps of:

configuring each object storage node (WOS node) with a scheduler mechanism and an IME client, performing a controlled retrieval of the data objects from the NVM units of the I/O nodes under supervision of the scheduler mechanism, and updating the OIDs in the DHT of the data objects written in the WOS nodes.

These and other objects of the present invention will become apparent when considered in view of a detailed description of preferred embodiment(s) and accompanying Patent Drawings.

DETAILED DESCRIPTION OF THE PREFERRED EMBODIMENT(S)

Figure 1:
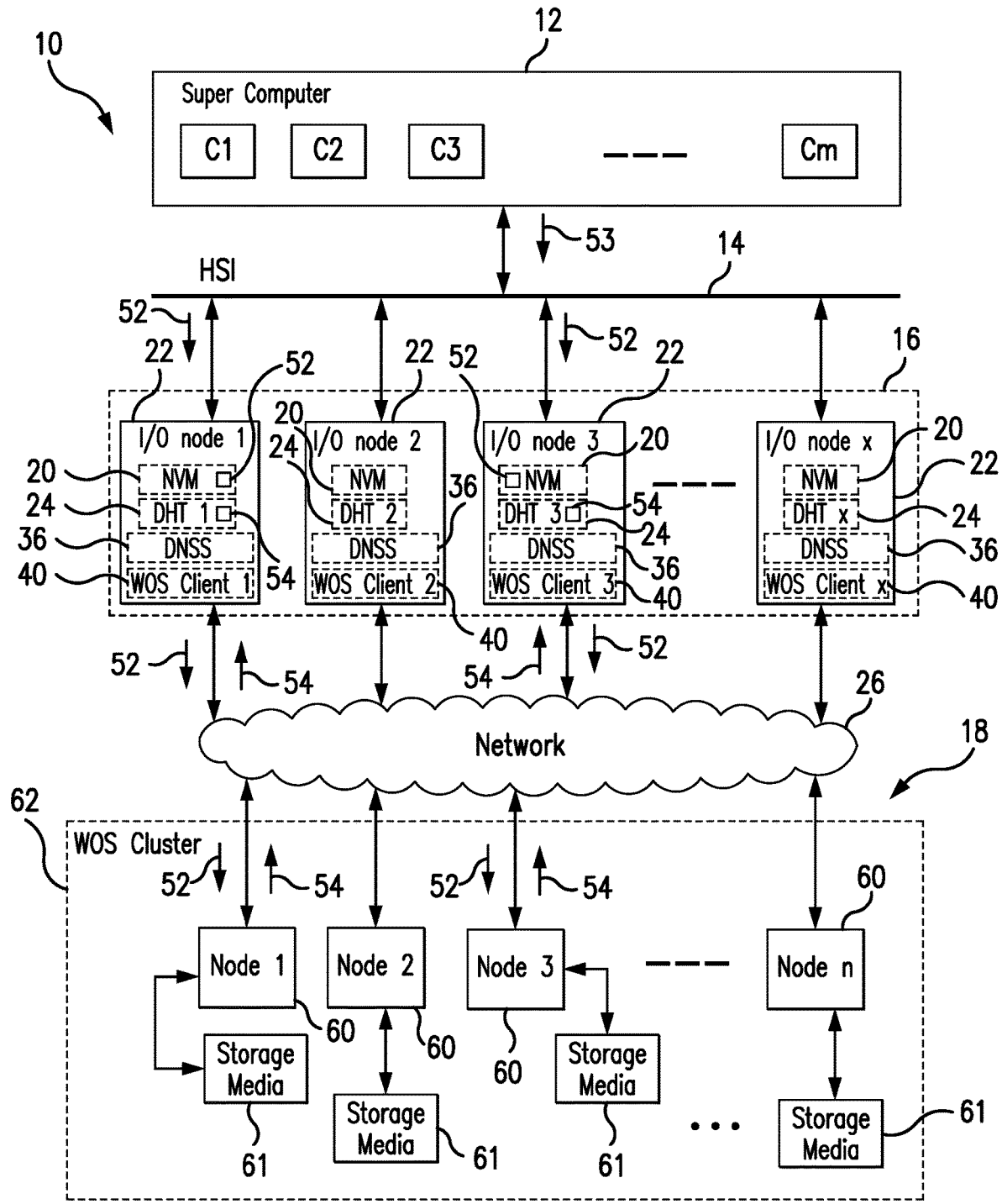
FIG. 1 is a block diagram of the subject data migration and storage system using a "push" data "write" approach.

The subject system 10 is the data migration and storage system which includes a number of compute nodes 12. The compute nodes 12 may be arranged in computing groups (or compute clusters) to perform complex computations of various types. The compute nodes may also be intermittently referenced to as data generating entities, or computing architectures, as well as clients, or hosts.

The operation of the compute nodes 12 depends on the system application. They may function as servers, super computing clusters, etc., and have the capacity to "WRITE" by outputting the data to (as well as "READ" data from) an external memory, or other type storage media.

The compute nodes 12 are operatively connected through a High Speed Network (HSN) 14 to an intermediate storage layer 16, which may also be referred to as a Burst Buffer (BB) tier. The BB tier 16 serves as a mediator between the high performance computing architectures 12 and an object storage system 18.

The High Speed Network 14 functions as a high speed switch, and may be based on any of the network transport protocols, such as, for example, InfiniBand (IB), Fibre Channel (FC), gigabit Ethernet (GigE), Wireless LAN (WLAN), etc. In addition, the HSN 14 may conform to the Cascade, as well as Gemini architecture, may use an optical fiber technology, may be proprietary, etc.

The present system's operation is based on the Infinite Memory Engine (IME) concept which aims to integrate Non-Volatile Memory (NVM) 20 into the parallel storage stratum. The Burst Buffer (BB) tier 16 in the subject system 10 serves as a mediator between the HPC (High Performance Computers) 12 and the object storage system 18 for long-term data storage. The IME combines non-deterministic write methods with inferential data location techniques based on address domains. By using these techniques in a cooperative manner, the data storage system attains extremely fast data ingestion into a set of I/O nodes 22 within the BB tier 16 while supporting a consistent "read" view of the object storage system 18.

As a technology, the IME exploits a large array of NVM devices 20 which are connected via a low-latency infrastructure for enabling fast ingest of data migrating from data generating entities 12 to the NVM arrays 20 by allowing the data to be temporarily stored in the NVM arrays 20 of the BB tier 16 in an unstructured manner, and permitting the system to provide parallel egress of the objects from the distributed NVM arrays 20 to a "permanent" (or long-term objects) storage 18, where they reside, and can be READ or DELETED from, as requested by the compute nodes 12.

The subject system 10 is capable of handling any type of data transfer. However, as an example, the following description of the system operation will be centered on the parallel objects creation in the BB tier 16 and migration of the objects to the WOS (Web Object Scaler) storage system 18.

The data generated by the compute nodes 12 is initially stored in the intermediate storage (BB tier) 16 which includes Non-Volatile Memory (NVM) 20, and subsequently is written to primary storage which is the WOS storage system 18. The NVM 20 serve as a burst buffer and can be implemented based on Hard Disk Drives, Solid-State Drives (also known as Silicon Storage Devices (SSDs)), flash memory devices, NAND-based flash memory, phase change memory, spin-transfer torque memory, and other non-volatile storage media that may be accessed in an expedited manner.

The intermediate storage layer (or BB tier) 16 includes a plurality of servers referred to herein as I/O nodes 22. Each I/O node 22 includes (or is operatively coupled to) a portion of a Distributed Hash Table (DHT) 24, and the NVM 20 attached (or coupled) thereto.

As shown in FIG. 1, the $DHT_1$, $DHT_2$, ..., $DHT_X$ are the portions of the DHT maintained by the I/O nodes 22 of the BB tier 16. The DHT 24 is primarily used to maintain location information for stored unstructured layout metadata (ULM), for data items stored by the computing nodes 12 in the object storage system 18. The DHT 24 may also store parity group information (PGI), data item attributes, and other information about the stored data items.

The I/O nodes 22 are adapted for interfacing with the object storage system (WOS) 18 through a Network 26. The Network 26 is shown coupled between the BB tier 16 and the WOS object storage system 18. Alternatively, the Network 26 may span both the BB tier 16 and the WOS system 18.

The Network 26 may be a local area network, a Wide Area Network, or their combination, and may include wire lines, optical fiber cables, wireless communication connections, etc., and may be a combination of these technologies. The network 26 also may include the Internet. The Network 26 may be public or private, may be a segregated network, and may be a combination thereof. The network 26 may include networking devices such as routers, hubs, switches, and the like.

The WOS storage system 18 is an object management and placement system that is designed and optimized for the storage and maintenance of immutable data. It has been idealized for WORM (Write Once Read Many) objects that are stored and used in Internet, research, and commercial data centers.

WOS 18 is not a traditional file system and it does not use a file system for data storage. The WOS storage system 18 has been designed for extremely high input/output operations per seconds, and overall service performance by implementing the following key features:

- WOS is configured as a flat (single layer) address structure where objects are stored in a contiguous group of blocks (objects) so that disk operations are minimized and performance is maximized;
- File system commands have been reduced to simply PUT, GET, and DELETE commands;
- WOS system groups objects of the same or similar size in addressable containers. Random block operations are not permitted in WOS since the entire concept of file allocation table and extend list entries has been eliminated by design. Fragmentation growth is simply impossible in the WOS system;
- WOS generates object names in the form of object identifiers (OIDs), so that the relational data structures required to retrieve an object can operate in a database rather than an inefficient directory tree;
- All objects stored in WOS contain a specific check sum field which is always tested for consistency when an object is serviced. This eliminates the need for additional hardware to maintain data integrity;
- WOS data distribution and continuance is policy based and is defined for each object in the system. This deterministic placement system assures that the rules regarding the replication and placement of objects (as will be detailed in further paragraphs) is the responsibility of the WOS cluster and not of an external server;
- Geographically distributed WOS clusters (which are envisioned as dynamically arranged portions of the WOS cloud) act to both propagate and protect data by maintaining replication compliance regardless of failures through peer-to-peer parallel operations.

The WOS storage system 18 is basically a WOS cloud 50 of WOS nodes 60, which can be dynamically arranged and rearranged into WOS clusters 62. The WOS cluster 62 is implemented as an automated high performance data distribution and protection mechanism that functions without continuous external management and can be used to establish an inherently unbreakable distributed and balanced cloud service.

The WOS storage system 18 may be included in a single cabinet, rack, shelf, or blade. When included in a single cabinet rack, shelf or blade, the storage media 61 may be coupled with a back plane, and a controller may be included in the cabinet, rack, shelf or blade with the storage devices. The back plane may be coupled with or included in the controller which may communicate with and allow for communications with the storage media 61 according to the storage media specification. Storage media may include cartridge drives, solid state drives, hard drives, flash memory devices, and other like devices.

Figure 2:
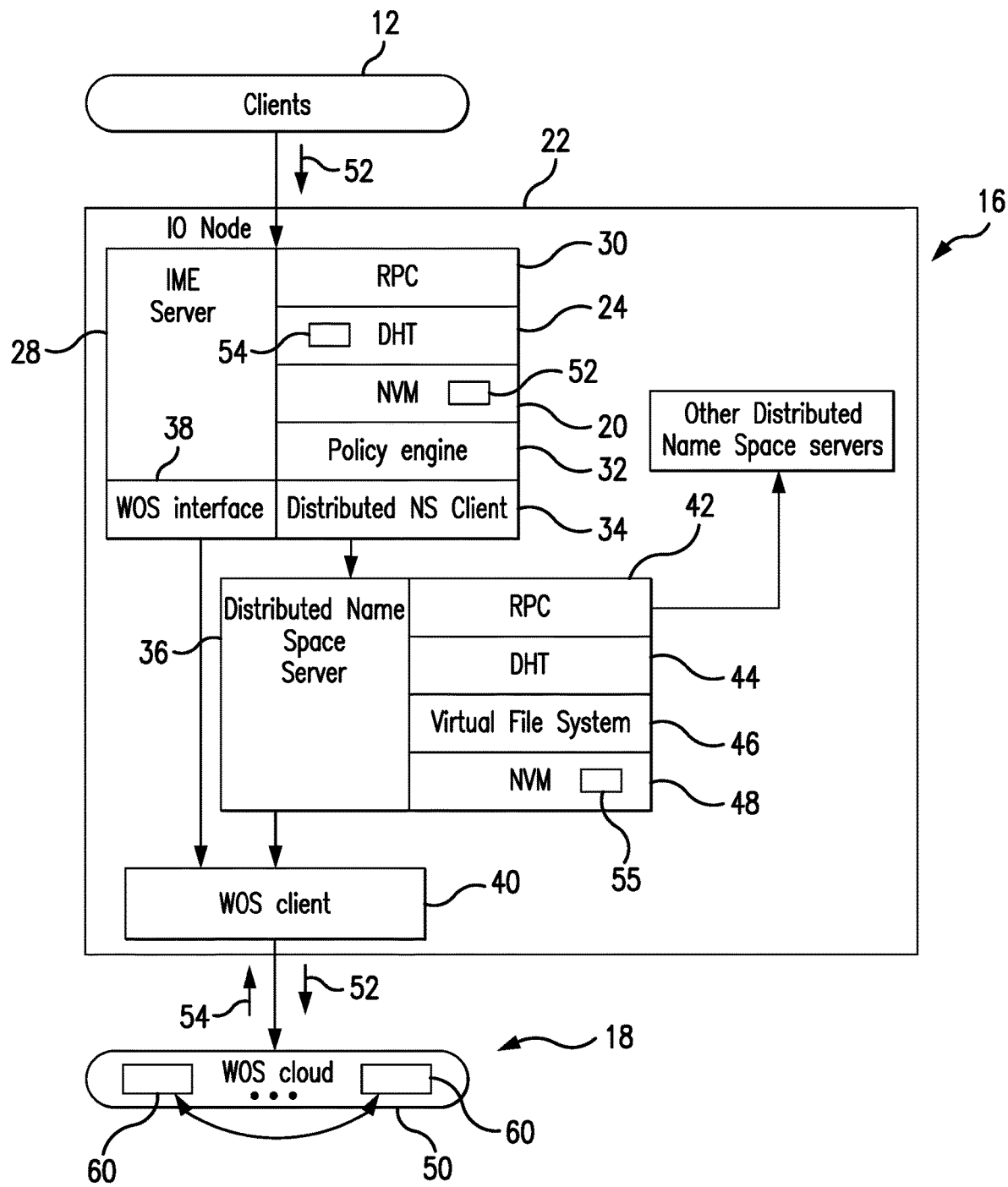
FIG. 2 is a schematic representation of an I/O node of the BB tier in the subject data migration and storage system.

Referring to FIGS. 1 and 2, each I/O node 22 is built with the IME (Infinite Memory Engine) server 28 which is coupled to the data generating entities 12 through the High Speed Interface 14. The IME server 28 is provided with the Remote Procedure Code (RPC) mechanism 30 which is used in distributed computing when a computer program causes a procedure (sub-routine) to execute in another address space (commonly, on another computer or a shared network), which is coded as if it were a normal (local) procedure call, without the programmer explicitly coding the details for the remote interaction. The RPC 30 in the IME server 28 provides communication with other distributed IME servers 28 in the BB tier 16.

The IME server 28 is further provided with the DHT (Distributed Hash Tables) 24, and the NVM 20.

The I/O nodes 22 (as well as WOS nodes 60) in the present system are capable of operating as a group, as a DHT system, or a part of a DHT system. The storage nodes may operate solely as storage nodes and communicate almost exclusively with one another to orchestrate the storage of data objects, the updating of databases and metadata related to the storage of data objects, and to communicate requests to store data objects.

The WOS nodes 60, as well as I/O nodes 22, are interconnected through the network 26, and data migrates through the network 26 from (and to) the nodes, such as WOS nodes 60 or I/O nodes 22. The DHT 24 is configured to derive the location of a particular data object within the subject system. All (or a portion of the hash) may be stored on each I/O node as necessary.

Furthermore, the IME server 28 is provided with a Policy Engine 32 which determines the allowed and limited operations as will be detailed in further paragraphs.

A Distributed Name Space client 34 is provided in the IME server 28 to support operative interrelation between the IME server 28 and the Distributed Name Space server 36.

WOS interface 38 is provided in the IME server 28 for operative coupling to the WOS client 40.

In order to read, write and delete data stored on the object storage system 18, the application program (which may run on the compute nodes 12) may communicate with an object access service or interface, which is further referred to herein as a WOS client. More specifically, the compute nodes 12 may use the WOS clients 40 to read, write, and delete objects stored in the storage WOS nodes 60. Each of the WOS nodes 60 may run a local file system, and the WOS client 40 (residing, for example, on I/O node 22 as shown in FIGS. 1, 2, 3, 4) provides an interface between the I/O nodes 22 and the local file system on the WOS storage nodes 60.

WOS client is an executable program that is configured to (a) connect to the WOS storage system via a connection to the MTS (the WOS cluster manager), (b) construct a latency map to WOS nodes 60, (c) to program the API methods to GET and PUT data objects from (and into) the WOS storage, (d) to decompose "large" object operations into small object operations, (e) to perform the erasure encoding of "assured" objects, and (f) to maintain a map of objects replication groups to the WOS nodes.

The Distributed Name Space Server 36 is operatively coupled to the IME server 28, and specifically to the Distributed NS client 34. The Distributed Name Space Server 36 is provided with the RPC unit 42 for communication with other Distributed Name Space Servers in the BB tier 16. The DNS server 36 is further configured with DHT 44, Virtual File System 46, and the NVM 48.

The DHT server (which basically includes the DHT 24 coupled to, or residing at, the IME servers 28, and the DHT 44, coupled to or residing at the DNS servers 36) is embedded in the subject system and is configured to the I/O group operations into batches referred to as Jumbo Transaction Groups (JTGs). The JTG mechanism provides fewer, larger transactions among the peers I/O nodes.

The DHT system also requires that the JTGs must be completed by the order they were requested, to ensure data consistency. The DHT system requires that each data operation must be made active at substantially the same time for a group of I/O nodes involved in the JTG so that a consistent data set is presented to data request.

A Jumbo Transaction Group (JTG) is a plurality of batched operations from one I/O node 22 or WOS node 60 of a group that is designed for one or more other I/O nodes. For example, a JTG may be a batch of operations involving one I/O node and a plurality of WOS nodes in communication therewith, and making up a part of the DHT.

In the JTG batching process, a series of data object requests is batched together so that a given I/O node may make requests of its peer storage nodes in groups rather than as each request comes into the storage into the I/O node. The word "peer" (within the context of the present Patent Application) refers to storage nodes or I/O nodes within the group.

In this manner, the volume of data traffic across all of the storage nodes (I/O nodes) can be minimized, while ensuring that the traffic that does occur is substantive. This helps to avoid situations in which the network is flooded with millions of requests to access, read or write relatively small amounts of data. Instead, requests and associated communications are batched to lower the overall network overhead of these communications. The JTG group is specifically described in U.S. Pat. No. 9,152,649 which is hereby incorporated by reference, and is not further detailed herein.

The DHT system also enables subsequent JTGs delivery requests to be appended with commit requests for earlier JTGs.

The Distributed Name Space server 36 is operatively coupled to the WOS client 40 which, in its turn, is coupled to the WOS cloud 50 (or the WOS cluster 62 as a portion of the WOS cloud 50).

The DHT (24 and 44) in the I/O nodes 22 (as shown in FIGS. 1, 2, 3, 4 and 5) is used to store information about the objects stored in the WOS nodes 60 of the WOS object storage system 18. The DHT 24, 44 holds object identifiers (OIDs) for stored objects which are furnished by the WOS nodes 60 and returned to the DHT associated with the I/O nodes 22.

The DHT also may store metadata about the objects, namely a contextual or control information including, but not limited to an object type, the creator of the object, the owner of the object, access permissions, creation time, elapsed time, etc. The metadata may be stored in a format of the key-value pairs. In some embodiments, the metadata is searchable, that is the compute nodes 12 may search for objects according to the metadata about objects included in the DHT 24, 44.

In order to perform "write" of an object to the object storage system 18, the compute node 12 passes a "write" request and object data (e.g., a file) to the I/O nodes 22. The write requests may also include metadata about the object.

The WOS client 40 in the I/O node 22 identifies the storage (WOS) node 60 at which the object is to be stored. The WOS node 60 may be evaluated according to various criteria depending on implementation and needs, and may be the least used storage node, the busiest storage node, the emptiest storage node, type of replication and others.

The I/O nodes 22 send the objects with a "write" request to the identified WOS nodes 60 in the WOS cluster 62. The "write" requests may include metadata about the objects. The storage node 60 creates an identifier for the object and writes the object to the storage media 61.

Each of the storage nodes 60 connects to storage media 61 which may take various configurations. Each of the WOS nodes 60 includes object file system software which controls access to the storage media 61.

A controller (not shown) may be included internally in or externally coupled with the WOS nodes 60 to contribute to the implementations of the techniques described herein. The object storage system's routines may be implemented as software, hardware, or firmware, or a combination thereof.

The servers in the BB tier, as well as WOS nodes 60, may include one or more logic arrays, memories, and digital or analog circuits, software, firmware, and processors such as microprocessors, field programmable gate arrays, specific integrated circuits, programmable logic devices and programmable logic arrays, and combinations thereof.

The WOS node 60 reports successful "write" to the I/O node 22 and provides the object identifier to the DHT 24, 44 of the I/O node 22 (or to the DHT portions of several, or all I/O nodes 22) in the BB tier 16. The I/O node 22 then reports that the "write" was successful to the requesting application (compute node) 12 and provides the object identifier OID thereto.

In addition, the I/O node 22 may also provide metadata about the object to the compute nodes 12. The NVM 20 and DHT 24, 44 in the I/O nodes 22 maintain information about the stored objects according to the object identifiers and also may store and maintain metadata about the stored objects.

At the I/O nodes 22, the OIDs can be obtained from the DHT 24, 44, and the PUT ("write") can be made against that reservation (PUTOID), as will be detailed in further paragraphs.

The "READ" requests from the WOS storage 18 can be performed by the WOS clients 40 based on the requests from the compute nodes 12. The DHT server is used to obtain the OID of the requested object file from the WOS node 60, and the OID is used to GET ("read") the object file therefrom.

Parallel File Creation in the IME Server with the Distributed Name Space

The routine of the parallel file creation in the subject system 10 is initiated when one (or more) client(s) 12 request(s) creation (or opening) of one or more files. At least one client 12 sends the "file open" (or "file create") requests to one (or several) I/O node(s) 22 provided with an IME server 28.

The IME server(s) 28 receive(s) the "file open" (or "create file") requests, and search(es) for the file(s) in their Distributed Hash Tables (DHTs) 24, which contain name space information.

If the IME servers 28 have knowledge of the requested files in their DHTs 24, then the IME servers create virtual Inodes for the existing files, and respond to the clients 12 with the virtual Inodes. Subsequent to the receipt of the virtual Inodes, the clients 12 can begin file operations with the virtual Inodes they have been provided, and the IME servers send the requested file I/O (data "write" request) to their Non-Volatile Memory 20.

If, however, the IME server(s) 28 determine(s) that the file requests are for files that the IME servers are not aware of, then the IME servers assign virtual Inodes for each client "file open" request, and forward the "file open" requests to the Distributed Name Space Servers 36 residing at (or operatively coupled to) the I/O nodes 22.

In some implementations of the subject system, the DNSS (which refers to the Distributed Name Space Server) may not be required. In an implementation where DNSS 36 is used, the DNSS may represent the server or service that implements the server.

If the IME's Policy Engine 32 permits, then the IME servers 28 can respond to the client 12 with the IME virtual Inodes for the clients 12 to begin file operations immediately. If, however, the IME Policy Engine 32 does not allow the immediate file I/O operation, then clients 12 have to wait until the IME server 28 receives the Inode from the Distributed Name Space Server 36.

Specifically, in the I/O node 22, the Distributed Name Space (DNS) servers 36 look up the requests in their Distributed Hash Tables 44. If the DNS servers 36 determine that the requested files exist, the DNS servers pass the file Inodes to the IME servers 28, and the file I/O operations to the object storage 18 begins. If, however, the DNS servers determine that the requested files do not exist, then the DNS servers assign new Inodes to the files, and respond back to the IME servers. The Distributed Name Space Servers 36 also begin creating new entries in their Virtual File System 46.

The Distributed Name Space Servers 36 in the BB tier 16 communicate each with the other via the RPC 42 to ensure that the file operations are atomic and automatically resolve multiple "file create" (or "file open") requests to the same file. The Distributed Name Space servers have knowledge of the backing storage (NVM) and are aware of the available capacity. The file Inodes and Virtual File System 46 entries are saved to the Non-Volatile Memory 48.

At the BB tier 16, the IME servers 28 automatically keep the file operations coherent even if multiple clients 12 attempt to create (or open) the same file.

Parallel File Writes

After the IME servers 28 respond to the clients 12 with the virtual Inode for the files, the clients can begin file "writes". The IME servers 28 can begin saving the files data 52 to the BB tier's NVMs 20 after they have received Modes from the Distributed Name Space Servers 36.

The Policy Engine 32 in the IME server 28 determines when the IME server 28 should begin writing the data to the backing storage 20. The IME Policy Engine schedules the "writes" if the IME server's NVM storage 20 is filling up, or if an idle timeout has expired on the data and it is unlikely to be updated, or if the compute job on the WOS cluster 62 has been completed.

The Distributed Name Space servers 36 maintain lists 55 of the backing objects 52 for each file. The lists 55 are saved in the NVM 48. Movement of the data from the NVM 20 in the IME servers 28 to the object storage system 18, and the allocation of the backing objects 52 is accomplished with one of three methods, including the push routine, the multipart process, and the pull routine.

Parallel Data Ingest in to the WOS System 18 from the IME Server 28

Objects in the object file system are accessed by and identified by a unique object identifier (OID) which may include three (or four) components, such as the version identifier, the location identifier, a unique identifier, and optional flags. The object ID (OID) 54 is specified in the DHT (Distributed Hash Table) 24.

The version identifier refers to a particular version of the object such that the system may have multiple copies or multiple versions of the same object stored in one or more locations in the subject file system. The version identifier may be a simple integer and may be represented by a byte of data.

The location identifier specifies in which storage node (or nodes) an object resides. The location identifier may be a simple integer and may be represented by a byte of data. The location identifier may include both a group identifier and an index.

The group identifier may refer to grouping of objects. The grouping may be arbitrary or may reflect that those objects are stored in the same region, such as for example, on a particular storage node, or on a particular storage media (such as a hard drive, or a storage device). The group ID may be used to map the object to a particular storage node or storage media. The mapping may be stored in a mapping file maintained by the object file system. The mapping information is distributed and is hierarchical.

More specifically, the I/O node 22 stores a portion of mapping information in its memory (NVM) as a distributed DHT 24. Similarly, the WOS node 60 holds a portion of the mapping information in its memory. Meta copies of the mapping information may be kept on a disk or other non-volatile storage media on the storage nodes 60. The Meta copies of the mapping information are dynamically updated to be consistent with any changes made while the system is active.

The index may be the specific location of the object within the group and may refer to a specific location on a disk or other storage device.

The object identifier (OID) uniquely identifies an object in the system and how to locate it without a repository of OIDs locations. As a request passes through the system, the OID becomes more specific on defining where the object is on a physical disk. In the process, the client library decodes the OID identifying the ORG. The WOS client 40 has a mapping of ORGS to WOS nodes, so that the WOS client can target a WOS node to request the object therefrom. The WOS node has a mapping of ORGs to disk (storage media), and the object index defines the location on the disk.

The unique identifier is a unique number or alpha numeric sequence that is used to identify the object on the particular storage media. The unique identifier may be randomly generated, may be the result of the hash function of the object, or may be created using another technique.

The object identifier may optionally include flags which may be used to distinguish between different types by providing additional characteristics or features of the object. The I/O nodes may use the flags to identify whether to retrieve or delete objects.

Figure 3:
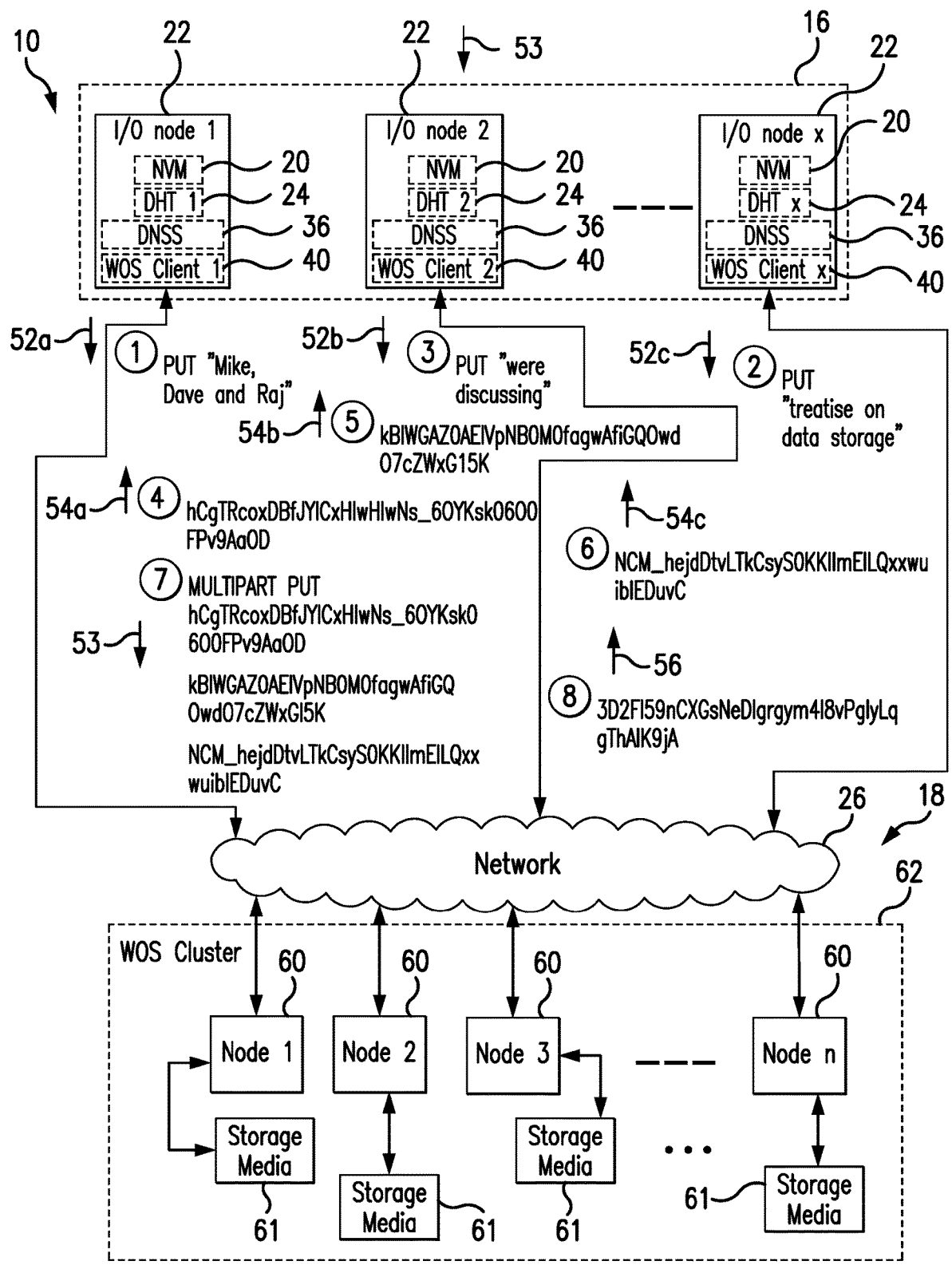
FIG. 3 is a block diagram of the subject data migration and storage system demonstrating a multipart mode of operation.

For example, as shown in FIGS. 1 and 3, when the objects 53 are large, they may be broken into sub-objects 52. The flags may be useful in the handling of large objects and their constituent sub-objects. Similarly, the group ID that may be included as a part of the location ID, and may be used in mapping and reassembling the constituent parts of large objects.

The parallel file creation can be attained by either using:

(i) the push approach at the I/O nodes 22 which is shown in FIGS. 1 and 2, where the I/O nodes 22 push data objects 52 to the WOS system 18, receive OIDs 54 from the WOS nodes 60, and save OIDs 54 in the DHT 24. In the push mode of operation, the IME server 28 can perform an extra routine of multi-parting the OIDs 54 to form a single OID 56, and then update the DHT accordingly; or (ii) the pull approach, shown in FIG. 5, where the IME client 58 runs on WOS nodes 60 (or outside of WOS nodes), and streams data objects 52 to the WOS Storage 18.

The term data used herein includes a bit, byte, word, block, stripe or other unit of information. Data may represent the information for an object. An object refers to a group of data that is a file or a portion of a file that may represent text, numbers, data, images, photographs, graphics, audio, video, and/or a combination of the listed items.

The Push Approach

In the push approach illustrated in FIG. 1, the data objects 52 at I/O nodes 22 are written to the WOS storage 18, and the OIDs 54 of each written data object 52 are returned. Once the IME server 28 determines that the data (object) 52 is ready to be committed to the persistent object storage (WOS) 18, it can be committed directly to the WOS storage 18 using the multipart approach described in the following paragraphs and illustrated in FIG. 3.

FIG. 1 illustrates the principles of implementing the push approach in the subject system 10, where C1, C2, . . . , Cm are the m compute nodes in the super computer 12. The I/O nodes 22 are provided with the WOS client 40 to support the routine of parallel file creation as detailed in previous paragraphs.

To make the process fully parallel, the data is written from the BB tier 16 to the WOS storage 18 on the parallel channels. Alternatively, the data can be written using the JTGs (Jumbo Transaction Groups).

The use of the multipart routine can eliminate the need to keep data at the I/O node for longer than necessary, thus reducing the amount of the NVM storage (such as, for example, expensive SSDs) needed at the I/O node.

The multipart feature in WOS system 18 allows for the users 12 to combine multiple objects OIDs 54 into a single OID 56.

For example, as shown in FIG. 3, for a requested file sentence 53 "Mike, Dave and Raj were discussing a treatise on data storage", the requested file 53 can be formed into objects for ingestion in the WOS system 18, such as an object 52a "Mike, Dave and Raj", an object 52b "were discussing", and an object 52c "a treatise or data storage".

The objects 52a, 52b, 52c are written in parallel into the WOS nodes 60 in the WOS cluster 62. The object 52a ("Mike, Dave and Raj") is written from the I/O node 1 to the WOS cluster 62 of the WOS storage system 18 through the network 26 using the path 1. The object 52b ("were discussing") is written (PUT) into the WOS cluster 62 from the I/O node 2 of the BB tier 16 via the path 3 which is preferably in parallel with the path 1. The object 52c ("treatise on data storage") is from the I/O node x of the BB tier 16 to the WOS cluster 62 through the network 26 using the path 2 which is performed substantially in parallel with the PUT of the object 52a ("Mike, Dave and Raj") and the object 52b ("were discussing") which use paths 1 and 3, respectively.

The "write" of each object 52a, 52b, 52c is assigned a respective OID 54a, 54b, 54c, respectively. Specifically, the "write" of the object" 52a, i.e., "Mike, Dave and Raj", is assigned a respective OID 54a. Similarly, the "write" of the object 52b, i.e., "were discussing", is assigned an OID 54b, and the "write" of the object 52c, i.e., "a treatise on data storage", is assigned an OID 54c.

The return of the objects IDs (OIDs) 54a, 54b, 54c of the written objects 52a, 52b, 52c from the WOS cluster 62 to the respective I/O nodes 22 may occur in any order and to any I/O node in the BB tier 16, irrespective of where the object written into WOS cluster has originated.

As an example, illustrated in FIG. 3, the individual OIDs 54a, 54b, 54c are returned from the WOS cluster 62 on the paths 4, 5 and 6, respectively. In the example, shown in FIG. 3, the OIDs are returned to the I/O nodes of the object origination. However, any order or any I/O node is envisioned for receipt of the OIDs 54 from the WOS cluster 62.

The multipart object 53 PUT (writing) is shown as originating at the I/O node 2 to the WOS cluster 62 through the path 7. However, this PUT can be performed from any of the I/O nodes 22 in the BB tier layer 16.

Subsequently, three individual OIDs 54a, 54b, 54c assigned for the objects 52a, 52b, 52c, respectively, can be combined to result in a single OID 56. The return of the multipart OID 56 can be performed, for example, through the path 8 to the I/O node 2 that initiated (in this particular example) the multipart routine.

Depending on the order in which the final OID 56 was written, the original sentence 53 can be "read" when needed. The application (IME in this case) writing to the WOS system 18 has to keep track of the OIDs 52a, 52b, 52c, 56 if a specific order is required. Again, during the reading routine, the combined OID 56 (or individual OIDs 54) are read due to the provision that the original OIDs 54 are retained in DHT during the multipart routine.

With the multipart routine, the I/O Nodes (Peers) push the objects 52 to the WOS storage 18 on separate paths, obtain the pointer to the object (OID) for the object written on each path, and maintain the order of individual OIDs using just the pointers.

For example, if the super computer 12 generates a data "write" request (object) 53 having 10 GB of data, the data may be distributed to the NVMs 20 of ten I/O nodes (I/O node 1, I/O node 2, . . . , I/O node 10) 22 in the form of objects 52. Subsequently, the ten I/O nodes 22 in question write the distributed ten objects on separate ten paths to the WOS storage 18. In this process, each object (1 GB of data) is being written to the WOS storage simultaneously with other objects. Writing of the object of equal size is assumed just as an example, and parallel "writing" of objects of different sizes is also envisioned in the subject approach.

Each object "write" to the WOS 18 returns an individual Object Identifier (OID) 54.

An I/O node 22 whose DHT 20 collected the ten objects' OIDs 54, subsequently creates a multipart object (single OID 56), which is a relatively quick operation to tie the ten objects of the requested file together. The original 10 GB object 53 generated at the super computer 12 is now represented by a single Object Identifier 56 in the DHT 24.

If, for example, the 10 GB of data were created cumulatively on ten computers 12, i.e., C1, C2, . . . , C10, they would be written in parallel to the WOS storage 18 in the parallel file creation system as presented supra.

When a Compute node 12 requests a "read" of the data or modification of the data, which has been "written" to the WOS storage 18 and is no longer available at the I/O node 22, the data is still accessible but the fetch time of the requests may be extended. Once the JTG is formed, the single multipart object 53 is written. Since the multipart objects are represented by reference (pointers) to the data already written, the data can be rearranged by creating different multipart objects with the same set of original objects.

Figure 4:
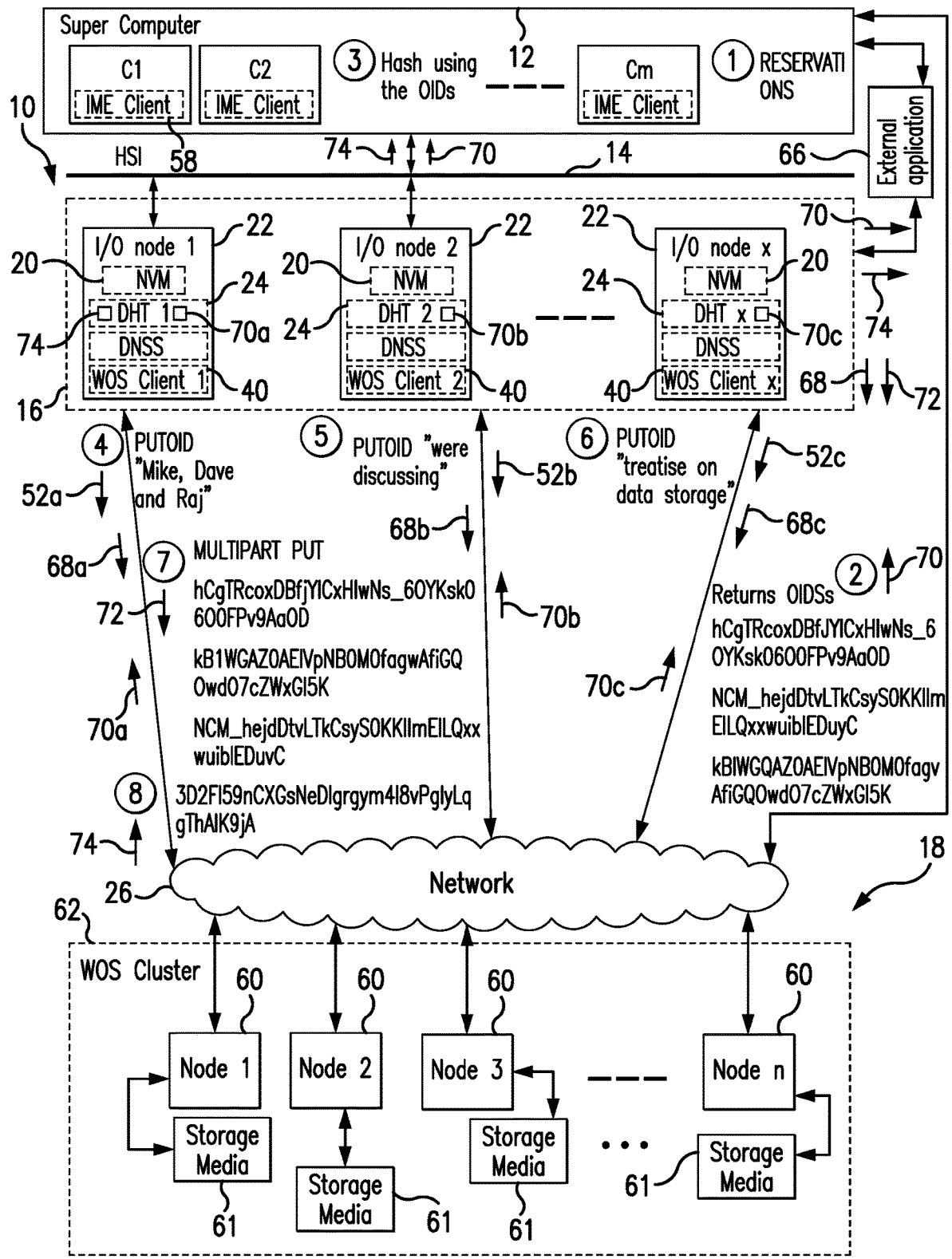
FIG. 4 is a block diagram of the subject system for data migration and storage demonstrating a multipart process addressing the reservation functionality.

FIG. 4 illustrates the multipart routine provided with a reservation feature. The WOS storage 18 has a feature called Reserve-PUTOID which permits a user to obtain Object Identifiers (OIDs) prior to the PUT (write) operation being completed.

The reservations function can be either performed by an IME client 58 at the compute node 12, or by an external application (process). In the example illustrated in FIG. 4, an external process (application) 66 is used to make reservations instead of the IME client. In this arrangement, the external process 66 needs to know the WOS policies available on the WOS cluster 62 to make reservations and provide IME clients/I/O nodes/Compute nodes with the OIDs.

An external application 66 passes a "reserve" request 68 to a one or several of the I/O nodes 22 in the BB tier 16 to initiate the routine for space reservation for an object to be stored on the object storage WOS system 18.

The I/O nodes 22 which receive the "reserve" request 68 from the external application 66, identify the storage WOS nodes 60 in the WOS cluster 62 at which the reservations is to be made. Subsequently, the I/O nodes 22 send a "reservation" request 68 to the identified storage nodes 60, and the storage WOS nodes 60 create an identifier 70 for the reservation.

The WOS nodes 60 report a successful reservation to respective I/O nodes 22, and provide the object identifier 70 to the I/O nodes 22. Subsequently, the I/O nodes 22 report the successful reservation to the requesting application 66, so that the application 66 can manage the object identifier 70 and may provide the object identifier to the DHT 24 in the I/O node in question.

In the "reserve" write (or PUT) mode of operation for an object to be stored on the WOS object storage 18, the application 66 passes a "write" request specifying a reserved object to the I/O node 22. The I/O node identifies the WOS node 60 holding the reservation for the specified object, and sends a "write" request specifying the reserved object to the identified WOS node 60. The WOS node 60 verifies the presence of a reservation for the specified object, and then writes the object to the storage media 61.

Subsequently, the WOS node 60 reports the successful "write" of the specified object to the I/O node 22. The I/O node 22, in turn, reports the successful "write" of the specified object to the requesting application (which may also run on the compute node 12 as the IME client 58). The IME client 58 (or the application 66) subsequently manages the object identifier 70 and provides the object identifier to the DHT 24.

Specifically, as exemplified in FIG. 4, the PUTOID 68a, 68b, 68c for the object 52a ("Mike, Dave and Raj"), object 52b ("were discussing"), and object 52c ("treatise on data storage") are carried out on paths 4, 5 and 6, respectively. Also, the multipart PUT reservation 72 may be sent over the path 7.

The objects reservation identifiers 70a, 70b, 70c for individual objects 52a, 52b, 52c are returned to the respective I/O nodes (or any I/O node in the BB tier 16). When the multipart PUT reservation 72 is made, the WOS cluster 62 (specifically the WOS nodes 60 servicing the multipart PUT reservation 72), return the multipart reservation OID 74, for example, via the path 8, which is recorded in the I/O nodes, specifically, in the DHT 24 thereof.

The subject object migrating system 10 is designed to provide limited access to the stored data. In the subject system, the object storage system supports only three object file commands: PUT (that is, write, or store, or set), GET (that is, read), and DELETE. The subject object file system may also support additional commands which would include reserve to reserve space for an object, and reserve "write", i.e., to "write" the reserved object.

The Pull Approach

Depending on the work flow, some users might prefer the pull approach as it gives them the ability to control the scheduling of data migration by using an external trigger to pull requested or selected data in the WOS storage system for archiving needs.

Figure 5:
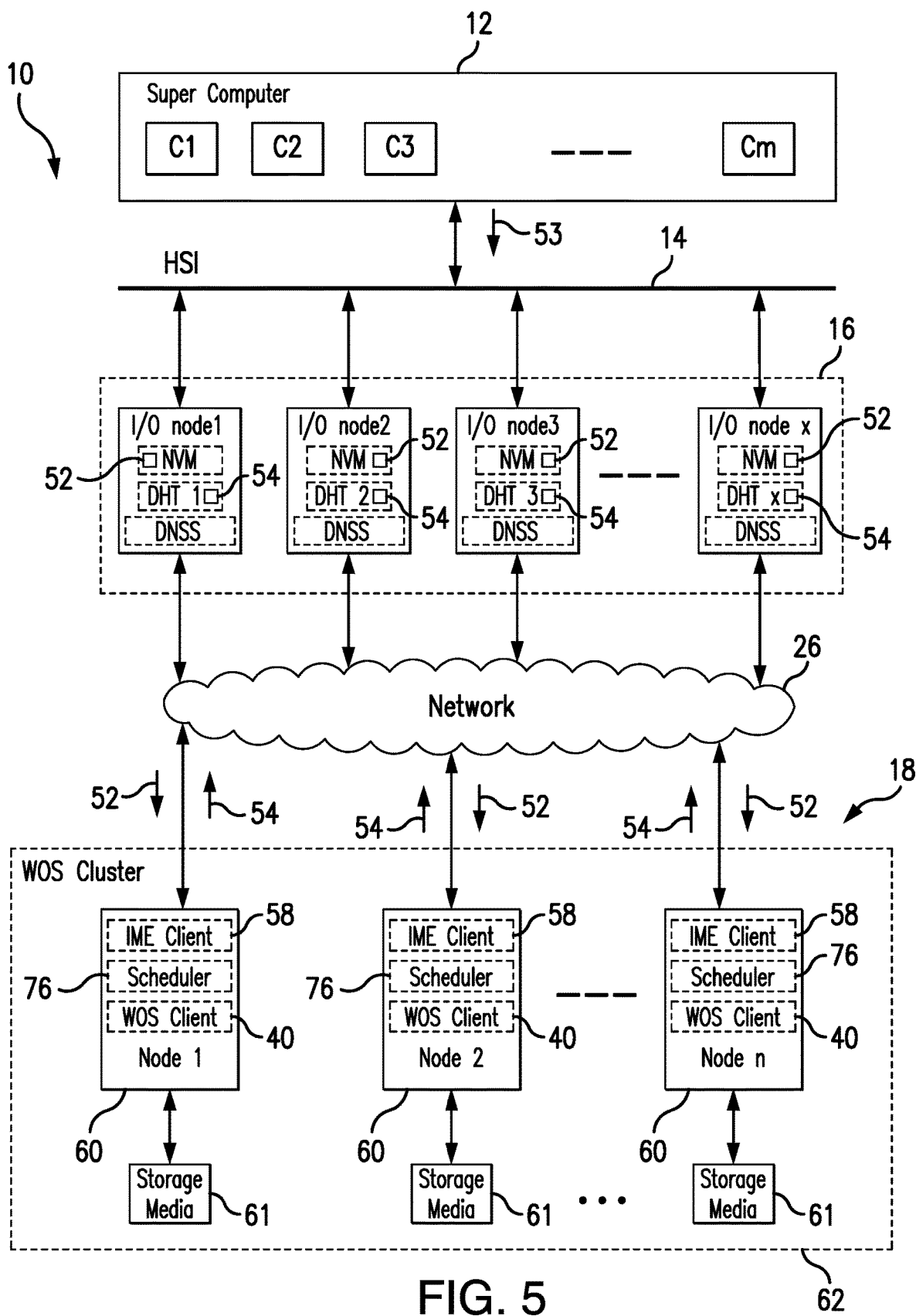
FIG. 5 is a block diagram of the subject data migration and storage system using the "pull" data "write" approach.

In the pull mode of operation, illustrated in FIG. 5, depending on how parallel the filing is desired, regular "writes" to the WOS storage system 18, or multiple objects "writes" from multiple IME servers, may be executed with a subsequent creation of a single combined object from the partial objects using the multipart routine. Instead of placing the WOS Client 40 on the I/O node 22 (as shown in FIGS. 1, 2, 3, 4), for the pulling mode of operation, the IME clients 58 reside on the WOS nodes 60. Alternatively, the IME client 58 may reside outside the WOS node, for example, on an external server.

The IME client 58 is software which executes the retrieval of the requested objects from the I/O nodes 22 (similar to its action when operating on the compute node 12, as shown in FIG. 4) based on a scheduler 76, writes the data to the WOS nodes 60, and updates the object in the DHT 24, 44 using the WOS node created OID. The GETs ("reads") can be also scheduled or be made a part of the commit routine of the JTG process.

Figure 6:
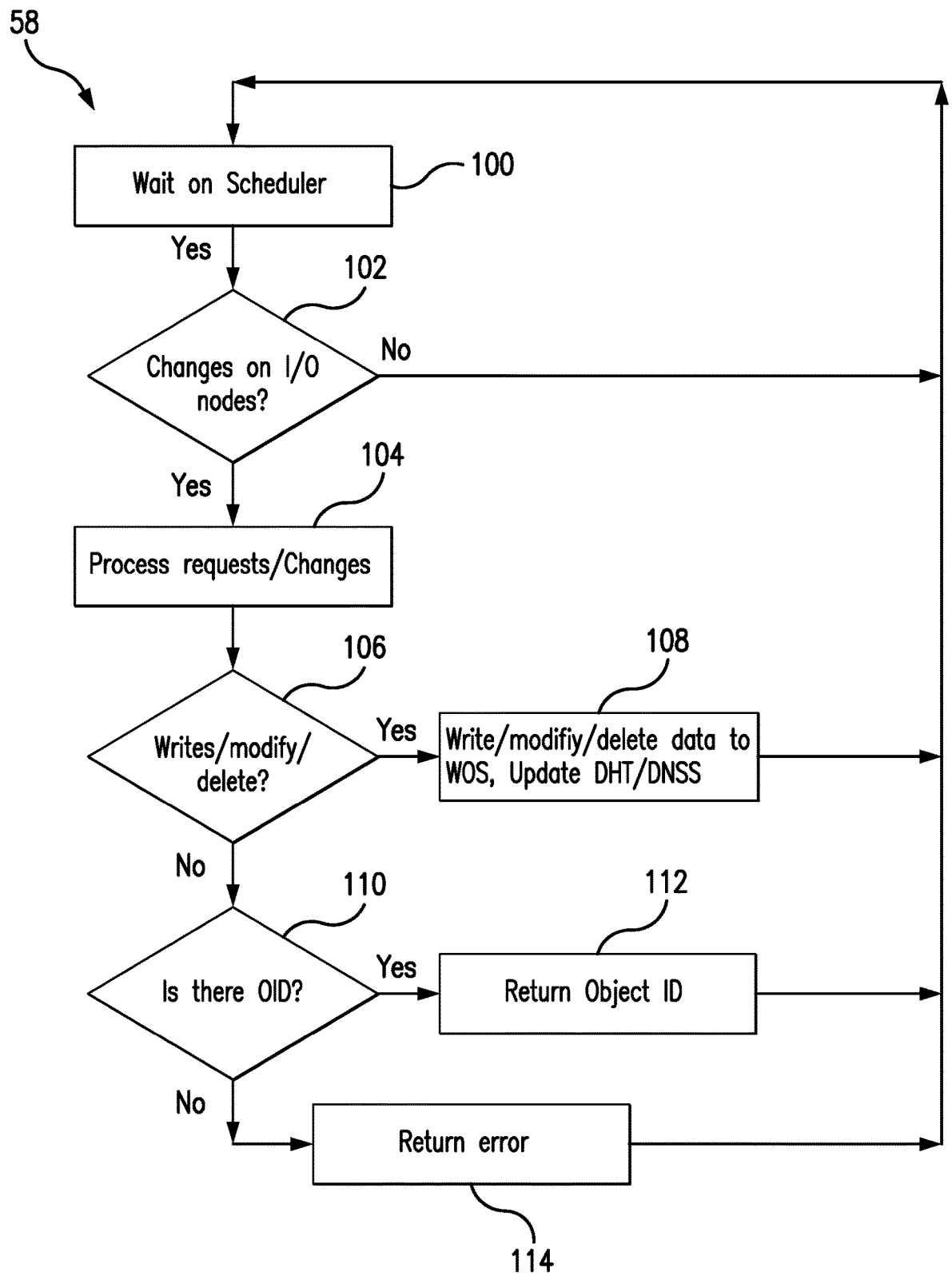
FIG. 6 is a flowchart diagram of the routine of the data "pull" from the BB tier to the WOS object storage based on a scheduler operation.

FIG. 6 illustrates the pull process from the IME server 28 to the WOS cluster 62 based on the scheduler 76.

Referring to FIGS. 5 and 6, in Step 100, the WOS node 60 waits for the scheduler 76 residing in the WOS node 60 of the WOS cluster 62. During the waiting mode in Step 100, the logic checks on the changes in I/O nodes 22. If in Step 102, no changes have been identified, the logic returns to Step 100 to continue waiting for the scheduler 76.

If, however, in Step 102, it was determined that there are changes on the I/O nodes, the logic moves to Step 104 to analyze the changes on I/O nodes corresponding to process requests.

Subsequently, from Step 104, the logic passes to logic block 106 where it is determined whether the changes in I/O nodes correspond to write/modify/delete request. If it is determined in logic block 106 that "writes", or modifications, or deletions are requested, the logic flows to Step 108 to service the request and to write/modify/delete data to the WOS cluster, followed by the updates corresponding to the DHT/DNSS. Upon executing the Step 108, the logic returns to Step 100 to wait for the scheduler.

If, however, it is determined in Step 106 that the detected changes on the I/O nodes are not write/modify/delete requests, the logic flows to logic block 110 to determine whether there is a returned OID. If the logic determines in Step 110 that there is an OID, the procedure flows to Step 112 to return the object ID to the DHT 24, and loops back to Step 100.

If however no OID related changes have been identified in Step 110, the logic flows to Step 114 to return the error to the I/O node and loops back to Step 100.

In the present system if a file is uploaded to the application or web server, the application (on the compute node 12) makes a call to the WOS client 40 to store (PUT) a new object. Subsequently, the WOS client 40 stores the object on a WOS node 60. Subsequent objects are automatically load balanced across the WOS cloud 50.

The WOS is composed of a number of zones containing WOS nodes. The system has the ability to replicate the data according to the WOS policy and can replicate the file to another zone or WOS cluster 62. All nodes in the WOS cluster are reachable from each other. A policy refers to the number of replicas an object should have in each zone, and the method of those replica copies should be made. The WOS nodes are part of a zone, and the WOS replication policies are defined using zones. The replication/policy determines the WOS nodes that can be used for the writes.

The WOS client 40 returns a unique object ID (OID) which the application on the compute node 12 stores in lieu of a file path. The application registers the OID with a content database (not shown) which services APP/WEB servers.

When a user desires retrieval of a file, the application on the client 12 makes a call to the WOS client 40 to read (GET) the object. Subsequently, the unique object ID (OID) is passed to the WOS client 40. The WOS client 40 automatically determines what WOS nodes 60 have the requested object, retrieves the object from the lowest latency source, and returns it to the application i.e., on the (requesting compute node 12), the application, in its turn, returns the file to the user.

Each WOS node 60 is configured for:
establishing and maintaining a connection to the WOS cluster via the cluster manager (MTS),
servicing I/O requests from clients (compute nodes),
directing local I/O requests to disk via the local data store,
replicating objects during PUTs,
replicating object groups (ORGs) to maintain policy compliance,
aggregating node-side statistics MTS, and
monitoring hardware health.

The WOS MTS is configured to:
serve as a central point of information about the cluster for WOS nodes and client systems, and
update the WOS nodes and compute clients with new information as required.

The WOS MTS is also responsible for activities that require a global view of the cluster, and serves as a central point of management for zones, policies, and nodes (WOS nodes), and serves as an aggregation point for performance statistics from WOS nodes.

WOS LIB is a software running on the WOS nodes which provides a latency observation service configured to keep track of end-to-end latency of requests into the WOS storage, to allow WOS LIB to make routine decisions based upon the global state of the WOS. A desirable side effect of this is the ability of providing locality of access as well as an automatic "load balancing" function. In addition, the WOS LIB is capable of querying nodes which have had high latency consistence if their high latency condition still persists.

Each compute node (client) 12 that connects to the WOS storage system 18 is provided by the MTS with a list of WOS nodes 60 in the WOS cluster 62. As requests are sent into the WOS 18, the latency of each request is recorded. Future requests to the WOS 18 are sent in a latency based fashion.

Although this invention has been described in connection with specific forms and embodiments thereof, it will be appreciated that various modifications other than those discussed above may be resorted to without departing from the spirit or scope of the invention as defined in the appended claims. For example, functionally equivalent elements may be substituted for those specifically shown and described, certain features may be used independently of other features, and in certain cases, particular locations of the elements may be reversed or interposed, all without departing from the spirit or scope of the invention as defined in the appended claims.

What is being claimed is:

1. A method for data migration between data generating entities and an object storage system, comprising:
   (a) establishing a data migration system coupled between a plurality of data generating entities and an object storage system, said data migration system comprising a Burst Buffer (BB) tier processor sub-system operatively coupled between at least one data generating entity from said plurality thereof and said object storage system,
   configuring said BB tier processor sub-system with a first plurality of operatively interconnected I/O node processors and a plurality of Non-Volatile Memory (NVM) sub-systems, wherein each NVM sub-system is operatively coupled with a respective I/O node processor of said first plurality thereof, and
   configuring each said I/O node processor in said BB tier processor sub-system with a Distributed Name Space (DNS) server;
   (b) configuring said object storage system of said data migration system as a Web Object Scaler (WOS) system having a second plurality of object storage node processors, said WOS object storage system being formed with a single layer_address structure, wherein data objects are stored in a contiguous group of objects, and wherein random object operations are prevented;
   (c) operatively coupling a Distributed Hash Table (DHT) processor sub-system to said BB tier processor sub-system, wherein said DHT processor sub-system includes a plurality of DHT processor sub-system portions, each of said DHT processor sub-system portions operatively coupled to a respective one of said first plurality of I/O node processors, and
   configuring said DNS server of each said I/O node processor with a respective DNS DHT processor sub-system portion;
   (d) sending, from said at least one data generating entity, a "write" request for writing at least two data objects to said object storage system, wherein said at least two data objects constitute cumulatively portions of a write request generated by said at least one data generating entity;
   (e) subsequent to receipt of said "write" request at said BB tier processor sub-system, assigning, by said at least one data generating entity, at least two I/O node processors from said first plurality thereof to handle said "write" request, and
   searching at least two files requested by said at least one data generating entity in said respective DNS DHT processor sub-system portions of said at least two I/O node processors;
   (f) receiving, at said BB tier processor sub-system, a file open request for each of said at least two data objects from said at least one data generating entity, and executing a routine of substantially parallel file creation in said at least two I/O node processors for said at least two data objects;

(g) storing by said BB tier processor sub-system, substantially in parallel, said at least two data objects in said NVM sub-systems of said at least two assigned I/O node processors, respectively;

(h) subsequent to said storing, by said BB tier processor sub-system, of said at least two data objects in said at least two assigned I/O node processors, performing substantially parallel writing of said at least two data objects from said NVM sub-systems of said at least two assigned I/O node processors to at least two object storage node processors of said object storage system in accordance to at least one mode of operation selected from a group including a push mode of operation, a multipart mode of operation, a pull mode of operation, and a reservation mode of operation;

(i) subsequent to writing of each of said at least two data objects, each to a respective one of said at least two object storage node processors, generating, by each said respective object storage node processor, an object identifier (OID) parameter for said each data object written in said respective object storage node processor; and (j) storing said OID parameter for said each written data object in at least one respective DHT processor sub-system portion of said plurality thereof, thus attaining a low latency data migration with increased I/O waveband, and an efficient accessibility to said each written data object.

2. The method of claim 1, further comprising:
in said step (a), configuring each said I/O node processor in said BB tier processor sub-system with an Infinite Memory Engine (IME) server, and operatively coupling said Distributed Name Space (DNS) server to said IME server,
configuring said IME server with an operative connection to said DHT processor sub-system portion and said NVM unit sub-system of said plurality thereof,
configuring said DNS server of each said I/O node processor with a respective DNS NVM processor sub-system, and a Virtual File Processor System,
if at least one file of said at least two requested files exist therein, creating, by said DNS server, a virtual Inode file structure for said existing file of said at least two requested files, and passing said virtual Inode file structure to said IME server operatively coupled to said DNS server, and
responding, by said IME server, to said at least one data generating activity with said virtual Inode file structure.

3. The method of claim 2, further comprising:
if at least one of said at least one requested files is absent from said DNS DHT processor sub-system portions of said at least two I/O node processors, assigning, by said DNS server, a virtual Inode file structure to said at least one absent file, and
responding, by said IME server, to said at least one data generating entity with said assigned virtual Inode file structure.

4. The method of claim 3, further comprising:
configuring said IME server of each of said at least two I/O nodes with a Policy Engine processor sub-system, and
determining, by said Policy Engine processor sub-system, when said at least one data generating entity is allowed to begin writing said at least two data objects from said NVM sub-systems to said at least two object storage nodes upon receipt of said virtual Inode file structures for said requested at least two files.

5. The method of claim 3, further comprising:
configuring said DNS server with a Virtual File System,
entering said virtual Inode file structures into said Virtual File Processor System, and
saving said requested files' virtual Inode file structures and corresponding entries to said Virtual File Processor System to said NVM sub-systems of said DNS servers of said at least two I/O node processors.

6. The method of claim 4, wherein said Policy Engine processor sub-system is configured to schedule the writes of said at least two data objects to said at least two object storage node processors based on at least one criteria selected from a group consisting of: fullness of said NVM sub-systems of said at least two I/O node processors, expiration of a predetermined idle timeout, completion of computations on said object storage system, and combinations thereof.

7. The method of claim 6, further comprising:
creating a list of data objects in each of said requested files by said DNS server, and saving said list in said DNS NVM processor sub-system.

8. The method of claim 7, further comprising:
configuring each of said DNS servers of said first plurality of I/O node/processors with a Remote Procedure Call (RPC) processor sub-system, and communicating with the DNS servers in said BB tier processor sub-system to prevent multiple file open request to the same file.

9. The method of claim 1, further comprising:
in said step (g), in said push mode of operation, configuring said each I/O node processor of said first plurality thereof with an object storage system client processor, and
pushing, by said BB tier processor sub-system, said at least two data objects from said NVM sub-systems of said at least two assigned I/O node processors to said object storage system via at least two parallel routes under control of said object storage system client processor.

10. The method of claim 9, further comprising:
in said step (h), in said multipart mode of operation, forming, by said BB tier processor sub-system, a multipart object from said at least two data objects, and
writing said multipart object substantially in parallel with said at least two data objects into said object storage system.

11. The method of claim 10, further comprising:
in said step (i), generating, by a respective object storage node processor, a single OID parameter for said multipart object written at said respective object storage node processor, and
in said step (j), storing said single OID parameter to said DHT server in said BB tier processor sub-system.

12. The method of claim 1, further comprising:
in said step (h), in said reservation mode of operation, generating, by said at least one data generating entity, a reservation request for said at least one data object to at least one I/O node processor of said first plurality thereof,
identifying at least one object storage node processor by said at least one I/O node processor for said reservation,
sending said reservation request to said at least one object storage node processor,
generating a reservation identifier by said at least one object storage node processor, sending said reservation identifier to said at least one I/O node processor, and saving said reservation identifier in said DHT server.

13. The method of claim 12, further comprising:

in said reservation mode of operation, generating a write request by said at least one data generating entity specifying said at least one data object for said reservation in said at least one object storage node processor, verifying presence of said reservation for said at least one specified data object, and writing said at least one data object to a storage media of said at least one object storage node processor.

14. The method of claim 1, further comprising:

in said step (h), in said pull mode of operation, configuring each said object storage node processor with a scheduler mechanism and an IME client processor, performing, by said BB tier processor sub-system, a controlled retrieval of said at least two data objects from said NVM sub-systems of said at least two I/O node processors under control of said scheduler mechanism, and updating, in said DHT processor sub-system, said OID parameter of said data objects written in said at least two object storage node processors.

15. A system for data migration between data generating entities and an object storage system, comprising:

a Burst Buffer (BB) tier processor sub-system operatively coupled between at least one data generating entity and an object storage system, and configured with a first plurality of operatively interconnected I/O node processors, each I/O node processor including a Distributed Name Space (DNS) server, and a plurality of Non-Volatile Memory (NVM) sub-systems, wherein each NVM sub-system is operatively associated with a respective I/O node processor of said first plurality thereof, said at least one data generating entity generating "write" requests for writing at least two data objects to said object storage system, wherein said at least two data objects constitute cumulatively portions of a write request generated by said at least one data generating entity;

said object storage system being configured as a Web Object Scaler (WOS) system with a second plurality of object storage node processors, said WOS object storage system being configured as a single layer address structure, wherein data objects are stored in a contiguous group of objects, and wherein random object operations are prevented;

a Distributed Hash Table (DHT) server operatively coupled to said BB tier processor sub-system, wherein said DHT server includes a plurality of DHT processor sub-system portions, each of said DHT processor sub-system portions being maintained by a respective one of said first plurality of I/O node processors, said DNS server of each said I/O node processor being configured with a respective DNS DHT processor sub-system portion;

wherein said DNS server is further configured to search at least two files requested by said at least one data generating entity in said respective DNS DHT processor sub-system portions of said at least two I/O node processors, and, upon receipt, at said BB tier processor sub-system, of a file open request for each of said at least two data objects from said at least one data generating entity, to execute a routine of substantially parallel file creation in said at least two I/O node processors for said at least two data objects;

wherein said at least one data generating entity is configured for assigning at least two I/O node processors from said first plurality thereof to handle said "write" requests, wherein said at least two data objects are temporarily stored, in substantially parallel fashion, in said NVM sub-systems of said at least two assigned I/O node processors of said BB tier processor sub-system;

wherein said BB tier processor sub-system wherein said at least two data objects from said NVM sub-systems of said at least two I/O node processors are transferred to at least two object storage node processors of said object storage system in accordance to at least one mode of operation selected from a group including a push mode of operation, a multipart mode of operation, a pull mode of operation, and a reservation mode of operation;

wherein said object storage node processors are configured, upon writing of said at least two data objects in said object storage system, to generate an object identifier (OID) parameter for said each data object written in said respective object storage node processor; and wherein said OID parameter for said each written data object is stored in a respective DHT processor sub-system portion of said I/O node processors, thus attaining an efficient accessibility to said each written object with a low latency and an increased I/O waveband of data migration.

16. The system of claim 15, further comprising:

an Infinite Memory Engine (IME) server, said Distributed Name Space (DNS) server being operatively coupled to said IME server, said IME server being configured with an operative connection to said DHT processor sub-system portion and said NVM sub-system of said each I/O node processor, said DNS server of each said I/O node processor being configured with a respective DNS NVM processor sub-system, and a Virtual File Processor System, and wherein, if at least one file of said at least two requested files exist therein, said DNS server is configured to create a virtual Inode file structure for said existing file, and passing said virtual Inode file structure to said IME server operatively coupled to said DNS server, for responding to said at least one data generating activity with said virtual Inode file structure; and wherein, if at least one of said requested files is absent from said DNS DHT processor sub-system portions of said at least two I/O node processors, said DNS server is configured to assign a virtual Inode file structure to said at least one absent file, and responding to said at least one data generating entity with said assigned virtual Inode file structure.

17. The system of claim 16, wherein said IME server of each of said at least two I/O node processors is configured with a Policy Engine processor sub-system, said Policy Engine processor sub-system being configured to determine when said at least one data generating entity is allowed to begin writing said at least two data objects from said NVM sub-systems to said at least two object storage node processors upon receipt of said virtual Inode file structures for said requested at least two files, said DNS server being further configured with a Virtual File Processor System for storing said virtual Inode file structures.

18. The system of claim 17, wherein said Policy Engine processor sub-system is further configured to schedule the writes of said at least two data objects to said at least two object storage node processors based on at least one criteria selected from a group consisting of: fullness of said NVM sub-systems of said at least two I/O node processors, expiration of a predetermined idle timeout, completion of computations on said object storage system, and combinations thereof.

19. The system of claim 18, further comprising:
a list of data objects in each of said requested files created by said DNS server,
said list residing in said DNS NVM processor sub-system.

20. The system of claim 19, further comprising:
Remote Procedure Call (RPC) mechanism processor sub-system operatively coupled to each of said DNS servers of said first plurality of I/O node processors for communicating with the DNS servers processor sub-system in said BB tier processor sub-system to prevent multiple file open request to the same file.

21. The system of claim 15, wherein in said push mode of operation, said each I/O node processor of said first plurality thereof is configured with an object storage system client processor sub-system, said object storage client processor sub-system being configured to push said at least two data objects from said NVM sub-systems of said at least two assigned I/O node processors to said object storage system via at least two parallel routes.

22. The system of claim 16,
wherein said at least one I/O node processor is configured to identify, in said reservation mode of operation, at least one object storage node processor for executing a reservation request for at least one data object, and
wherein said at least one object storage node processor is further configured to generate a reservation identifier to send said reservation identifier to said at least one I/O node processor for being saved in said DHT server.

23. The system of claim 16, wherein in said pull mode of operation, each said object storage node is configured with a scheduler mechanism and an IME client processor sub-system, said IME client processor sub-system being configured to perform a controlled retrieval of said at least two data objects from said NVM sub-systems of said at least two I/O node processors under control of said scheduler mechanism.

* * * * *